US008489454B1

(12) United States Patent
Goldstein et al.

(10) Patent No.: US 8,489,454 B1
(45) Date of Patent: Jul. 16, 2013

(54) SYSTEM, METHOD, AND COMPUTER PROGRAM PRODUCT FOR SENDING INFORMATION IN RESPONSE TO RECEIPT OF AN ALPHANUMERIC CODE PRESENTED WITH AN ADVERTISEMENT

(75) Inventors: Eyal Goldstein, Petach Tiqva (IL); Avishai Catane, Bet Shemesh (IL); Victor Tsype, Giyataym (IL)

(73) Assignee: Amdocs Software Systems Limited, Dublin (IE)

( * ) Notice: Subject to any disclaimer, the term of this patent is extended or adjusted under 35 U.S.C. 154(b) by 1057 days.

(21) Appl. No.: 11/840,685

(22) Filed: Aug. 17, 2007

(51) Int. Cl.
*G06Q 30/00* (2012.01)
(52) U.S. Cl.
USPC ................................. 705/14.4; 705/14.41
(58) Field of Classification Search
USPC ................................................ 705/14
See application file for complete search history.

(56) References Cited

U.S. PATENT DOCUMENTS

| | | | | |
|---|---|---|---|---|
| 2001/0003184 | A1* | 6/2001 | Ching et al. | 707/4 |
| 2002/0013727 | A1* | 1/2002 | Lee | 705/14 |
| 2002/0169668 | A1* | 11/2002 | Bank et al. | 705/14 |
| 2002/0184319 | A1* | 12/2002 | Willner et al. | 709/206 |
| 2003/0087051 | A1* | 5/2003 | Murray | 428/35.2 |
| 2003/0088581 | A1* | 5/2003 | Maze et al. | 707/104.1 |
| 2003/0093373 | A1* | 5/2003 | Smirnoff et al. | 705/40 |
| 2003/0120444 | A1* | 6/2003 | Zison et al. | 702/81 |
| 2003/0135842 | A1* | 7/2003 | Frey et al. | 717/121 |
| 2003/0141360 | A1* | 7/2003 | De Leo et al. | 235/379 |
| 2004/0014454 | A1* | 1/2004 | Burgess et al. | 455/405 |
| 2004/0093266 | A1* | 5/2004 | Dohring | 705/14 |
| 2004/0117255 | A1* | 6/2004 | Nemirofsky et al. | 705/14 |
| 2004/0177007 | A1* | 9/2004 | Van Luchene | 705/26 |
| 2006/0248446 | A1* | 11/2006 | Carlson et al. | 715/513 |
| 2007/0233662 | A1* | 10/2007 | Bashardoost et al. | 707/3 |
| 2009/0125975 | A1* | 5/2009 | Sasselli | 726/1 |
| 2010/0274675 | A1* | 10/2010 | Lee | 705/14.73 |

FOREIGN PATENT DOCUMENTS

| | | |
|---|---|---|
| KR | 20050007986 | 1/2005 |
| WO | WO 2006/049425 | 5/2006 |

* cited by examiner

*Primary Examiner* — Matthew T Sittner
(74) *Attorney, Agent, or Firm* — Zilka-Kotab, PC (57) ABSTRACT

A system, method, and computer program product are provided for sending information in response to a receipt of an alphanumeric code presented with an advertisement. In operation, an advertisement is presented with at least one alphanumeric code in an offline media. Additionally, the alphanumeric code is received by an advertiser from a device of a user. Further, additional information is sent in response to the receipt of the alphanumeric code.

24 Claims, 5 Drawing Sheets

SYSTEM, METHOD, AND COMPUTER PROGRAM PRODUCT FOR SENDING INFORMATION IN RESPONSE TO RECEIPT OF AN ALPHANUMERIC CODE PRESENTED WITH AN ADVERTISEMENT

FIELD OF THE INVENTION

The present invention relates to data networks, and more particularly to providing information in response to receiving a code presented with an advertisement.

BACKGROUND

Currently, advertisers who advertise in an offline media (e.g. magazines, journals, newspapers, Yellow Pages, etc.) may supply a phone number, email address, or a website URL in an advertisement as contact information. Thus, a reader of the advertisement may contact each business individually in order to receive more information regarding the advertised good or service. However, contacting each business individually may often be inconvenient for the reader of the advertisement, as well as for the business fielding such inquiries.

There is thus a need for addressing these and/or other issues associated with the prior art.

SUMMARY

A system, method, and computer program product are provided for sending information in response to a receipt of an alphanumeric code presented with an advertisement. In operation, an advertisement is presented with at least one alphanumeric code in an offline media. Additionally, the alphanumeric code is received by an advertiser from a device of a user. Further, additional information is sent in response to the receipt of the alphanumeric code.

DETAILED DESCRIPTION

Figure 1:
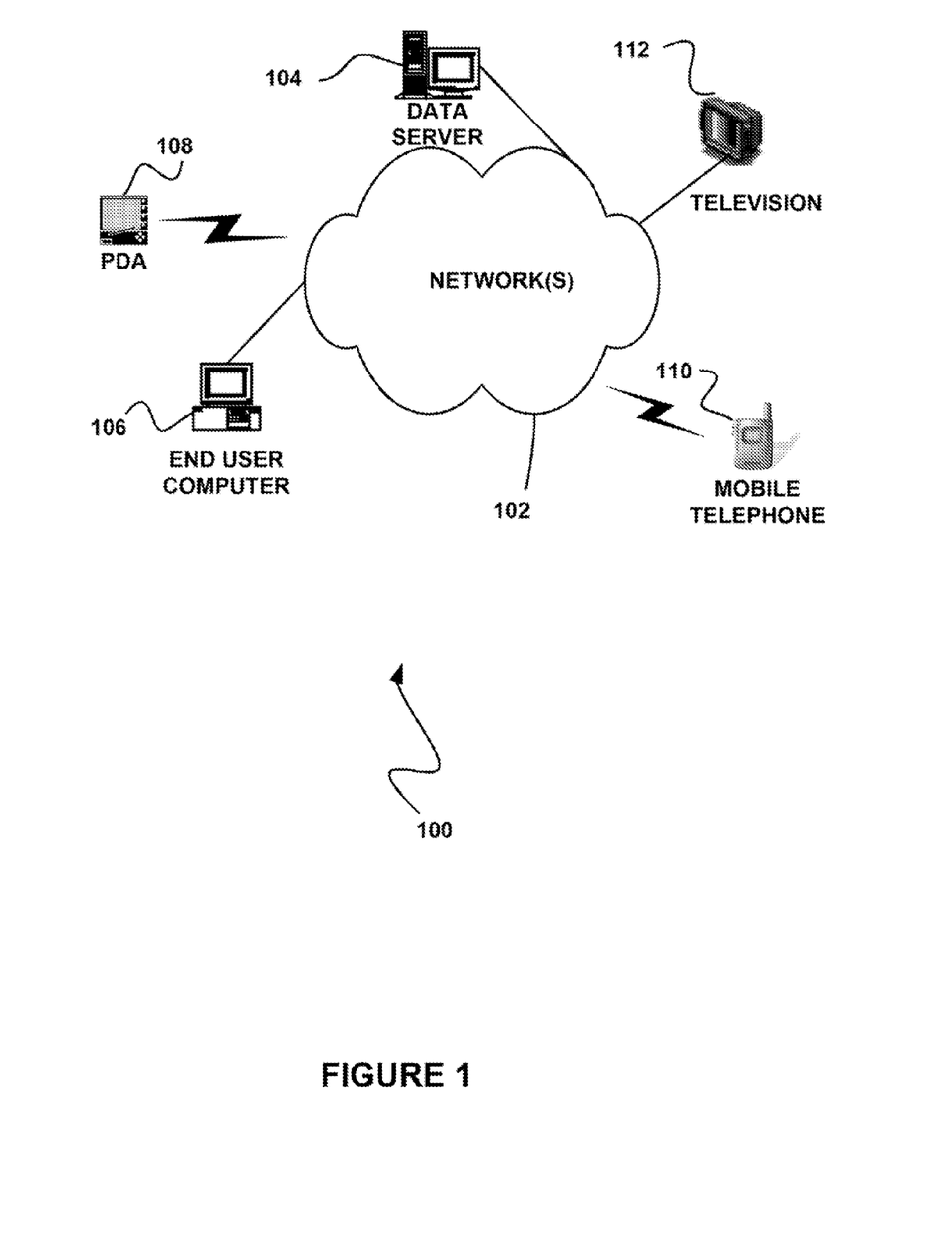
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
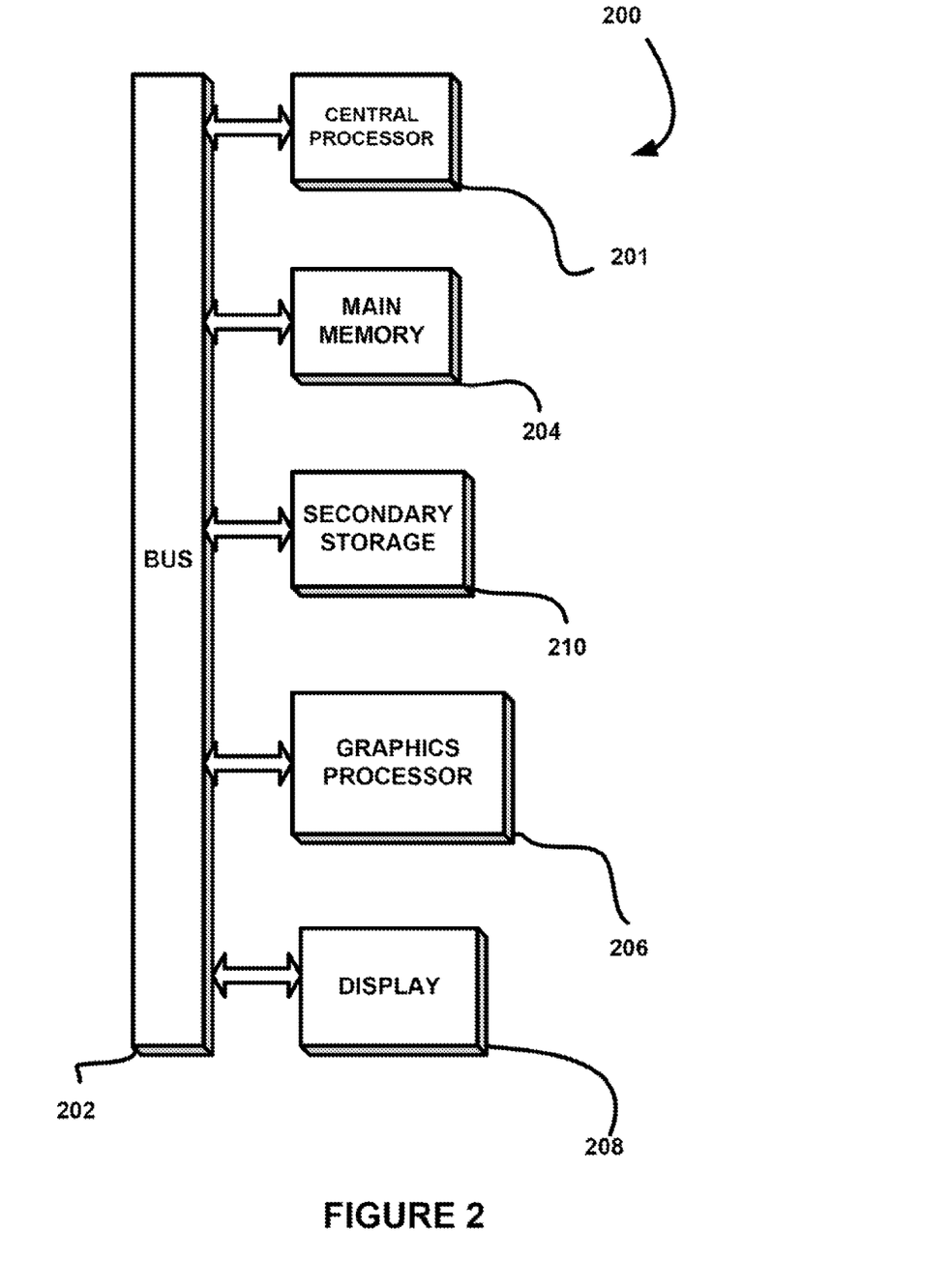
FIG. 2 illustrates an exemplary system in accordance with one embodiment.

FIG. 2 illustrates an exemplar system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
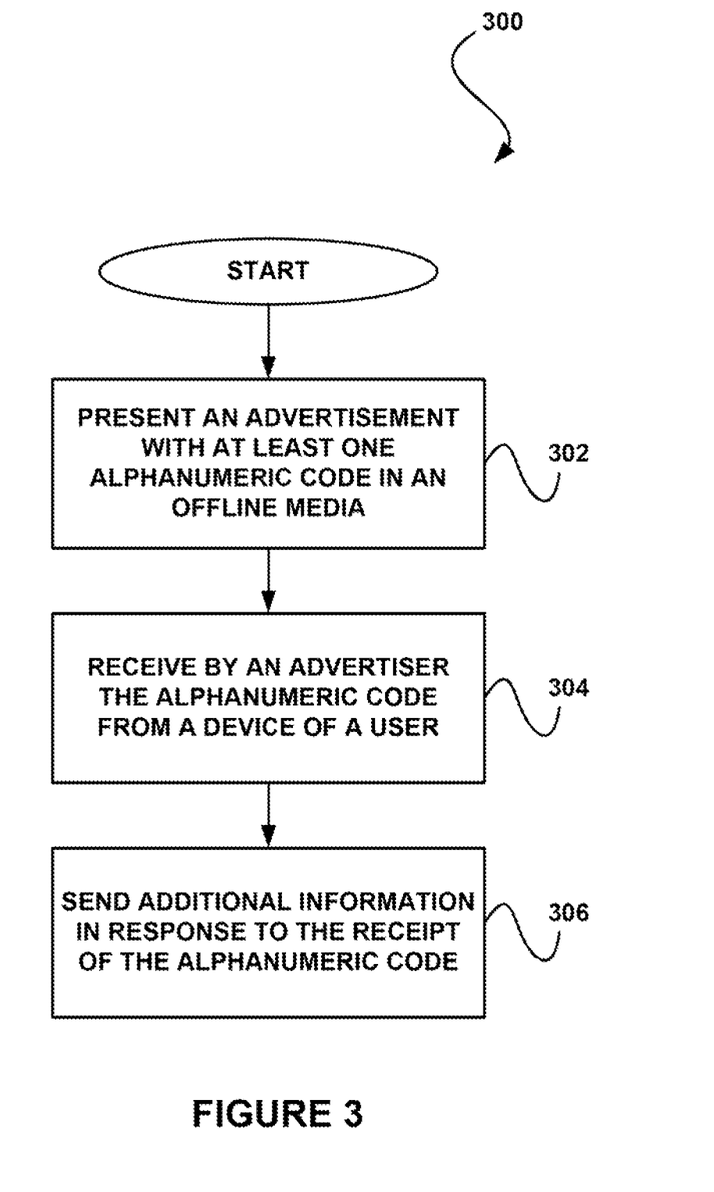
FIG. 3 shows a method for sending information in response to a receipt of an alphanumeric code presented with an advertisement, in accordance with one embodiment.

FIG. 3 shows a method 300 for sending information in response to a receipt of an alphanumeric code presented with an advertisement, in accordance with one embodiment. As an option, the method 300 may be implemented in the context of the details of FIGS. 1 and/or 2. Of course, however, the method 300 may be carried out in any desired environment. Further, the aforementioned definitions may equally apply to the description below.

As shown in operation 302, an advertisement is presented with at least one alphanumeric code in an offline media. In the context of the present description, the term advertisement may refer to a picture, survey, questionnaire, informational text, promotional content, product/service information, and/or anything that is designed to attract attention. Additionally, in various embodiments, the advertisement may be associated with a good and/or service.

Still yet, in the context of the present description, offline media refers to any printed text or images. For example, in various embodiments, offline media may include, but is not limited to journals, magazines, newspapers, phone books, advertisement books (e.g. Yellow Book, Yellow Pages, etc.), and/or any other offline media that meets the above definition. In one embodiment, the offline media may be downloaded from a website and printed.

Further, it should be noted that the alphanumeric code may be any series of letters and/or numbers. In one embodiment, the alphanumeric code may include a serial number. In such case, the alphanumeric code may be a one-dimensional code, for example.

In operation 304, the alphanumeric code is received by an advertiser from a device of a user. In the context of the present description, an advertiser refers to any individual or entity involved with the advertisement of products and/or services. For example, in various embodiments, advertisers may include, but are not limited to merchant advertisement representatives, vendor advertisement representatives, service provider advertisement representatives, good/product provider advertisement representatives, advertisement publishers (e.g. Yellow Pages, etc.), and/or any other individual or entity that meets the above definition.

Furthermore, in the context of the present description, a user refers to any individual or entity capable of sending an alphanumeric code from a device. For example, in various embodiments, users may include, but are not limited to consumers or potential consumers, customers or potential customers, and/or any other individual or entity that meets the above definition.

Additionally, the device of the user may be any device capable of sending the alphanumeric code. For example, in various embodiments, such devices may include, but are not limited to telephones, PDAs, computers, and/or any other devices that meet the above definition. In one embodiment, the device may include a mobile device.

It should be noted that the alphanumeric code may be received in a variety of ways. For example, the alphanumeric code may be received over a network, such as the network described in the context of the details of FIG. 1. Further, in one embodiment, the alphanumeric code may be received utilizing a wireless protocol. In one possible embodiment, the alphanumeric code may be received utilizing a short message service (SMS) protocol.

In still another embodiment, the alphanumeric code may be received utilizing a system of the advertiser, such as the system described in the context of the details of FIG. 2. Of course, in various other embodiments, the advertiser may receive the alphanumeric code utilizing any number of systems depending on a particular advertiser.

In operation 306, additional information is sent in response to the receipt of the alphanumeric code. In one embodiment, the additional information may relate to a good and/or service, an entity providing a good and/or service, etc. In another embodiment, the additional information may relate to a provider of the good and/or service. In various other embodiments, the additional information may include hours of operation, available products or services, coupons, a website, driving directions, etc.

Further, the additional information may be sent in any desired manner. In one embodiment, the additional information may be sent to the device via which the alphanumeric code was received by the advertiser. Just by way of example, the additional information may include a website displayed on a mobile device of the user which was used for sending the alphanumeric code to the advertiser. Of course, in another embodiment, the additional information may be sent to a device different from the device via which the alphanumeric code was received by the user.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
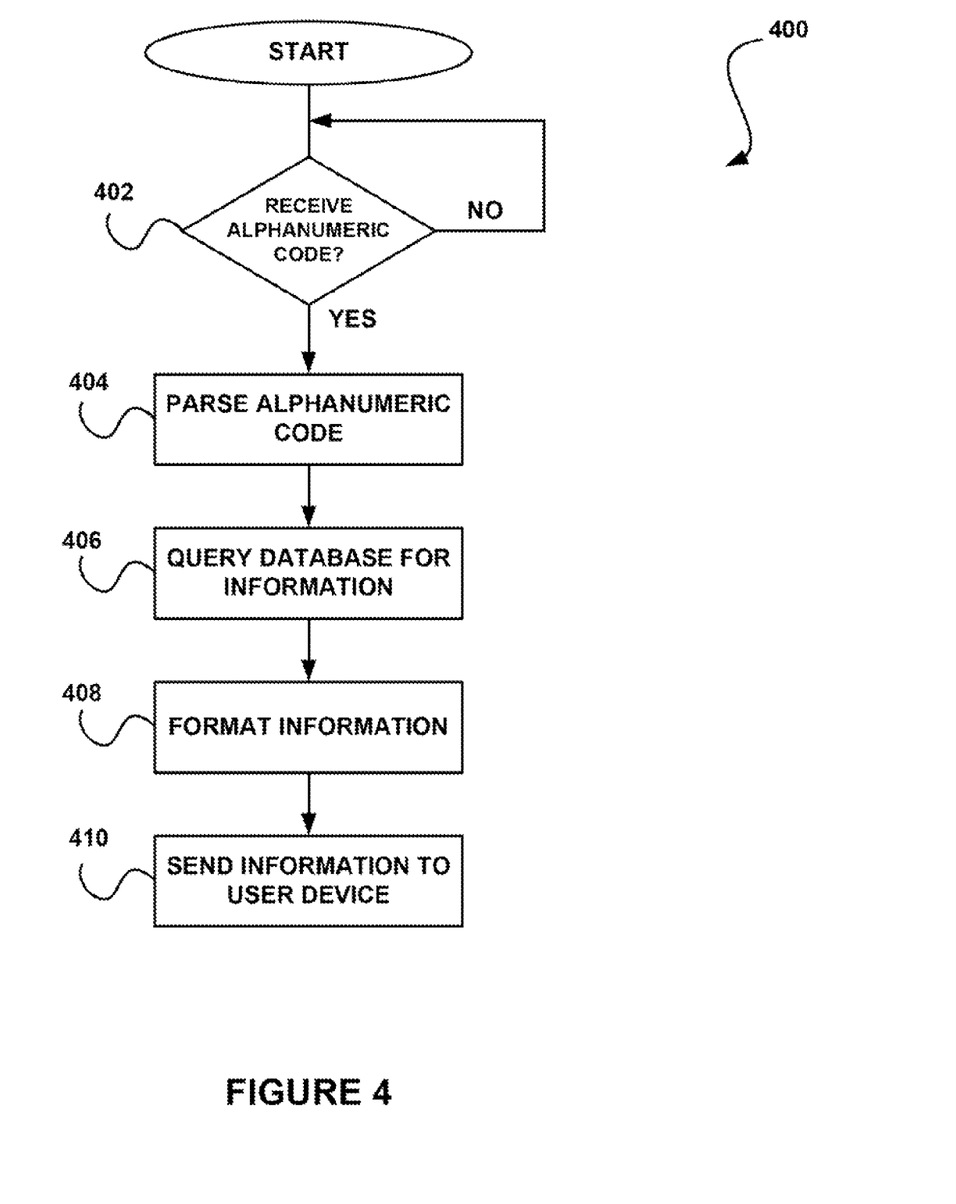
FIG. 4 shows a method for sending information in response to a receipt of an alphanumeric code presented with an advertisement, in accordance with another embodiment.

FIG. 4 shows a method 400 for sending information in response to a receipt of an alphanumeric code presented with an advertisement, in accordance with another embodiment. As an option, the method 400 may be implemented in the context of the details of FIGS. 1-3. Of course, however, the method 400 may be carried out in any desired environment. Further, the aforementioned definitions may equally apply to the description below.

As shown in operation 402, it is determined whether an alphanumeric code has been received. In one embodiment, the alphanumeric code may be received as a result of a user viewing an advertisement. Further, such advertisement may have an associated good or service, for example.

The alphanumeric code may be any series of letters and/or numbers. In one embodiment, the alphanumeric code may include a certain number of characters. As an option, the alphanumeric code may be unique to the advertisement.

For, example, in one embodiment, the alphanumeric code may be a five character alphanumeric code that is unique to that advertisement. Of course, the alphanumeric code is not limited to five characters. In various embodiments, the alphanumeric code may be comprised of any number of characters (e.g. 6, 7, 8, 9, . . . N).

Additionally, in one embodiment, a plurality of alphanumeric codes may be included with each advertisement. In such case, different additional information may be sent in response to the receipt of each of the alphanumeric codes. In one embodiment, the alphanumeric codes may each include a good or service component and an additional information component. For example, the alphanumeric code may include a five character base code which represents the good or service (e.g. "X34FG").

Additionally, the alphanumeric code may include a specific character length code which correlates to additional information about a product, service, or business supplying the product or service. For example, the additional information component may be comprised of a one character component corresponding to additional information such as hours of operation (e.g. "H"), driving directions to a business (e.g. "D"), product availability, (e.g. "P"), and/or any other relevant information. In various embodiments, the additional information component may be included at different positions within the good or service component (e.g. "X34FGP" or "PX34FG").

Furthermore, the alphanumeric code may be received in a variety of ways. In one embodiment, the alphanumeric code may be received via a predetermined number (e.g. phone number, etc.). In another embodiment, the alphanumeric code may be received utilizing a wireless protocol. In still another embodiment, the alphanumeric code may be received utilizing an SMS protocol.

In one embodiment, the alphanumeric code may include a serial number. Such serial number may be a serial number that uniquely corresponds to a product, for example. Similarly, the serial number may be a serial number that corresponds to a particular business. Of course, the serial number may correspond to any aspect of the advertisement or the advertisement provider.

In one embodiment, an advertiser may provide the alphanumeric code. In such case, a product and/or service provider may supply an advertiser with an advertisement. The advertiser may then assign an alphanumeric code or a plurality of alphanumeric codes to the advertisement. To this end, such codes may be provided as part of the advertisement published in an offline media, for example.

If it is determined that an alphanumeric code has been received, the code is parsed, as shown in operation 404. In one embodiment, the parsing may include parsing the alphanumeric code into a good or service component and an additional information component. In a situation where an additional information component is not provided, the parsing process may be bypassed in certain embodiments.

Once the code has been parsed, a database is queried for information. See operation 406. In one embodiment, the querying may involve querying the database utilizing the good or service component and/or the additional information component (in the case that such components are available).

In the case where the alphanumeric code includes an additional information component, the additional information component may be utilized to query for specific information. In such case, the database may be queried for the specific information corresponding to the additional information component. For example, the good or service component (e.g. "X34FG") may be used to find all of the information corresponding to the advertisement. The additional information component (e.g. hours of operation "H") may then be used to find the specific information corresponding to the additional information component.

In the case where the alphanumeric code does not include an additional information component, the entire alphanumeric code (i.e. the good or service component in this situation) may be utilized to query for any available information. Thus, the entire alphanumeric code may be used to find all of the information corresponding to the advertisement (e.g. "X34FG".)

In various embodiments, the additional information may include operating hours, product information, product/service availability, coupons, driving directions, and any other information which may be sought. In the absence of the additional information component in the alphanumeric code, a general information request (e.g. "X34FG") may result in a query for any information available in the database. In one embodiment, the query resulting from a general information request may be configurable by the advertiser. For example, the system may query for hours of operation and a general location as part of a general information request.

As shown in operation 408, the gathered information is formatted. Such information may be formatted in a variety of ways. In one embodiment, the information may be formatted to be received by a mobile device (e.g. a mobile phone, PDA, handheld computer, etc.). In another embodiment, the information may be formatted based on (e.g. to match) the format of the received alphanumeric code. In various embodiments, the information may be formatted into an email, a text message, an audio signal, and/or any other format acceptable for receipt by a particular device.

Once the information has been formatted, the information is sent to a user device. Note operation 410. Such information may thus be used, as desired, by the user.

Figure 5:
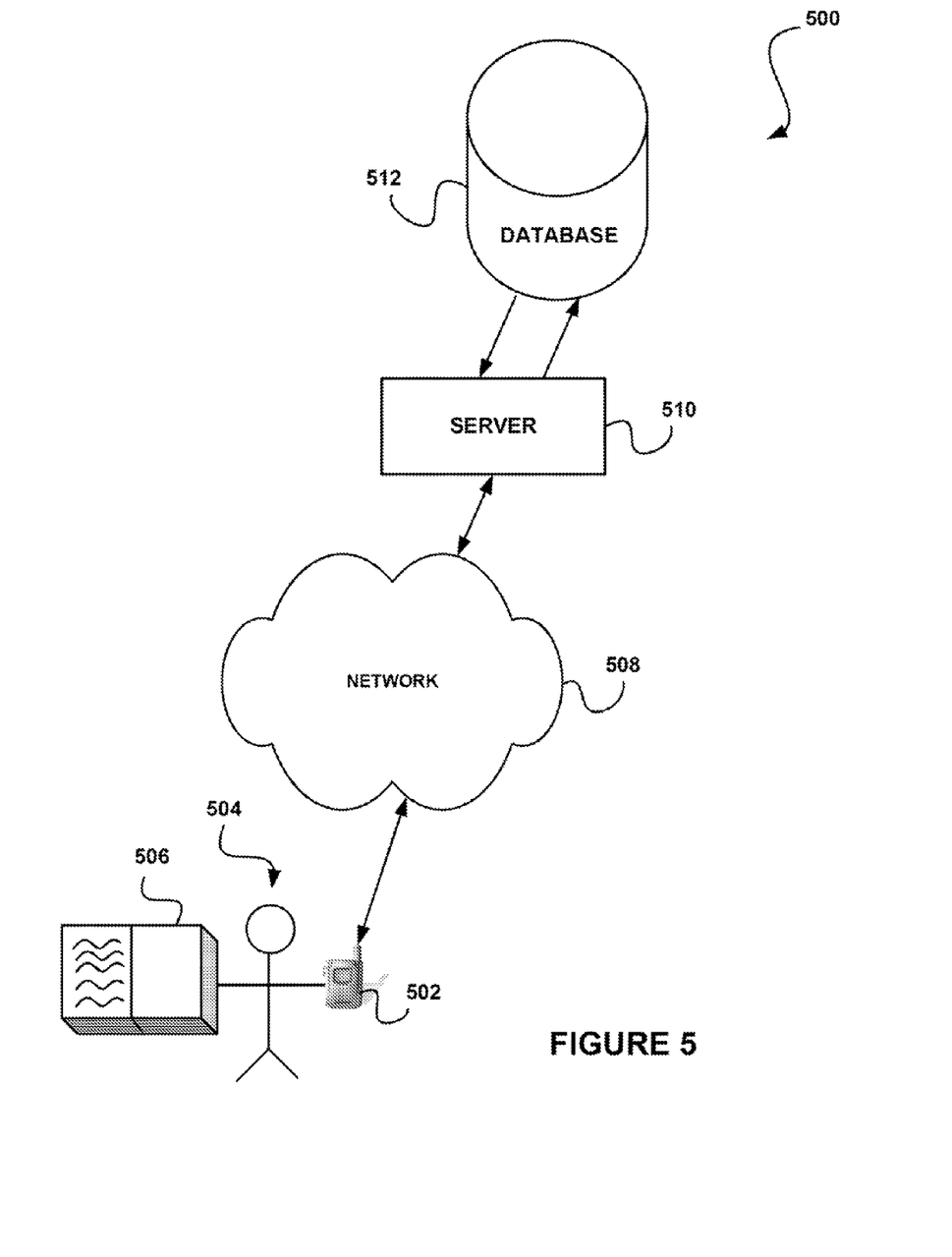
FIG. 5 shows a system for sending information in response to a receipt of an alphanumeric code presented with an advertisement, in accordance with one embodiment.

FIG. 5 shows a system 500 for sending information in response to a receipt of an alphanumeric code presented with an advertisement, in accordance with one embodiment. As an option, the system 500 may be implemented in the context of the details of FIGS. 1-4. Of course, however, the system 500 may be implemented in any desired environment. Further, the aforementioned definitions may equally apply to the description below.

As shown, a user device 502 is provided. As shown in FIG. 5, the user device 502 is a mobile phone. In other embodiments, however, the user device may be any device of a user 504. For example, in various embodiments, such device may be any device illustrated in FIG. 1. (e.g. a computer, PDA, etc.).

As shown further, the device 502 is in communication with a server 510 over a network 508. The network 508 may take any form including, but not limited to a telecommunications network, a local area network (LAN), a wireless network, a wide area network (WAN) such as the Internet, peer-to-peer network, cable network, etc.

Additionally, the server 510 is in communication with a database 512. The database 512 may be local to the server 510, or remote. For example, the communication between the server 510 and the database 512 may be accomplished over a network similar to the network 508.

In the context of the present description, the server 510 may be any server capable of receiving alphanumeric codes and querying the database 512. In one embodiment, the server 510 may represent a system of an advertiser of a specific advertisement. In another embodiment, the server 510 may represent a system of a general advertiser (e.g. a general publisher). In still another embodiment, the server 510 may represent a system of a media publisher (i.e. a Yellow Page publisher) involved with advertising.

In operation, the user 504 may view multiple advertisements in an offline media 506. The offline media 506 may represent any type of media containing advertisements (e.g. journal, magazine, newspaper, the Yellow Pages). The advertisements may be any type of advertisement including product advertisements and/or service advertisements.

Additionally, the advertisements may be in any format. For example, the advertisements may be in a format specific to a publisher of the media 506. Thus, the publisher may lay out the advertisements in any appropriate manner (e.g. column format, row format, etc.).

It should be noted that the publisher of the media 506, may or may not be an advertiser. In one embodiment, the media 506 may be a publication of an advertiser. In another embodiment, the advertiser may have supplied a publisher of the media 506 with an advertisement or a plurality of advertisements.

Further, each advertisement may include alphanumeric codes (e.g. an advertisement code or a plurality of advertisement codes, etc.) which are unique to the particular advertisement. In one embodiment, the advertisement codes may be selected by the advertiser. In such case, the advertiser may determine the length and the format of the advertisement code.

In one embodiment, the advertisement code may be a specific character length alphanumeric code. For example, the advertisement code may be an alphanumeric code comprising 5 characters. In other embodiments, the code may be any number of characters ranging from 3 to 10. Of course, the advertisement code is not limited to any number of characters.

It should be noted that the advertisement codes may be easily visible to the user 504 but printed in such a way as not to obstruct or interfere with the original advertisement. Thus, the advertisement code may be situated in a position which does not interfere with any text or art of the original advertisement. For example, in column advertisements, the code may be part of a border of the advertisements. In the case of display advertisements, the code may be positioned in a non-interfering corner of the advertisement. Of course, in various embodiments, the code may be positioned at any location in or near the advertisement.

After viewing the advertisement, the user 504 may decide to make an inquiry relating to a certain advertisement. The user 504 may then send the advertisement code corresponding to the advertisement to the server 510 utilizing the user device 502. In the current embodiment, this may involve manually entering the alphanumeric code into the user device 502 utilizing a keypad of the user device 502 (e.g. the mobile phone keypad). In this case, the alphanumeric code may be presented and formatted in the advertisement such that the alphanumeric code is capable of being manually keyed by the user 504 utilizing the keypad of the user device 502.

In one embodiment, the advertisement code may be text messaged [e.g. via SMS, multi-media messaging service (MMS), etc.] to a predefined number. In this case, the server 510 may receive the text message and identify the advertisement according to the advertisement code. In another embodiment, the advertisement code may be communicated via a vocal communication by the user 504 (e.g. utilizing a telephone, etc.). Once the advertisement has been identified, the server 510 may query the database 512 for information corresponding to the advertisement and/or the advertisement code.

After the query, the information obtained may be formatted such that the user device 502 may receive, and in turn, display the information. For example, the information obtained may be formatted into a text message or image capable of reception by a mobile phone. Once the information is formatted, the information may be sent to the user device 502 for use by the user 504.

In one embodiment, the information may be sent to the user device 502 in the form of a text message. In another embodiment, the server 510 may send the information to the user device 502 in the form of an email. For example, if the server 510 received the advertisement code in the form of an email request, the server 510 may respond by sending the information in the form of an email. Further, as an option, the server 510 may respond to the email request by sending the information in the form of a text message. In still yet another embodiment, the information may be sent in the form of a voice message delivered via a telephone (e.g. landline, mobile, etc.).

As an option, the server 510 may identify user information (e.g. information associated with the user 504 of the user device 502, such as a user profile). Such user information may be identified in response to the alphanumeric code received from the user 504, in one embodiment. For example, the server 510 may identify demographic information (e.g. age, income, location, etc.) associated with the user 504, a credit card number associated with the user 504, etc. Optionally, such user information may be stored in the database 512. To this end, the information sent to the user device 502 may be customized based on the user information. Moreover, the user information, such as a credit card number of the user 504, may be utilized for purchasing a good and/or service associated with the advertisement.

Additionally, as an option, the media 506 may include instructions on the use of the advertisement codes. Thus, the user 504 may refer to these instructions with questions regarding the use of the advertisement codes. In another embodiment, the media 506 may include contact information (e.g. phone number, website, etc.) for instruction queries.

In one embodiment, the advertisement codes may each include a good or service component and an additional information component. For example, in addition to a general advertisement code, a character (e.g. letter or number) representing the type of information requested may be included. For instance, for the advertisement code "X34FG," multiple variations may be utilized to correspond with different information relating to the advertisement, by adding additional characters to the existing code.

Thus, for the advertisement code "X34FG," the good or service component (i.e. the general advertisement component) may be comprised of "X34FG," and the additional information component may be comprised of any character or character combination that is included in addition to the good or service component "X34FG." Various examples illustrating the use of the additional information component are set forth below in Table 1.

TABLE 1

| Code | X34FG | X34FG H | X34FG P | X34FG C | X34FG D |
|---|---|---|---|---|---|
| Information Returned | All Available Information | Hours of Operation | Available Products | Coupon | Driving Directions |

As shown in Table 1, by including an additional character with the advertisement code, the user 504 may obtain specific information corresponding to the advertisement. For example, by sending an "H" along with the advertisement code "X34FG," the user 504 may receive the hours of operation for a business corresponding to the advertisement. In this case, the good or service component may be "X34FG," and the additional component may be "H." Thus, the entire advertisement code is comprised of "X34FGH".

If a "P" is sent along with the advertisement code, the user 504 may receive a list of available products/services in return. For example, in various embodiments, such available products/services may include current menus for restaurants, seating availability, movies playing in a cinema, movie times, rental availability for movies, and/or any other product/service information. In one embodiment, the available product/service information may be sent along with additional characters corresponding to different product or service availability options.

As described in Table 1, if the user 504 includes a "C" along with the advertisement code, the server 510 may query the database 512 for any available coupons relating to the advertisement. The server 510 may then send any available coupons to the user device 502. If no coupons are available, the server 510 may send a message indicating such.

In the case that the user 504 includes a "D" with the advertisement code, the server 510 may respond with driving directions to a particular business (e.g. a restaurant). Such directions may be in the form of text or a map image, for example. In the case where the user 504 sends the advertisement code with no characters corresponding to additional information, the server 510 may query the database 512 for any available information, and in turn, send any available information to the user device 502.

In one embodiment, a purchase of the good or service by the user may be tracked utilizing the database 512. For example, the advertisement code may be used to correlate a purchase of a good or service with user information. Thus, the database 512 may store the purchase information along with the user information. Such information may be stored along with the corresponding advertisement code, for example. In another embodiment, a separate database with profile data associated with the user may be included.

By storing the user profile data, the information sent to the user device 502 may be selected based on the profile data. Thus, the server 510 may select additional information to send to the user 504 which is consistent with the profile data stored for the user 504. In such case, the profile data may be used as information for directed advertising.

By storing purchase information corresponding to the advertiser code, an advertiser may be able track the effectiveness of the advertisement or an advertisement campaign. For example, the advertiser may track a number of queries using an advertisement code and/or an advertisement code along with a request for specific information, in addition to the number of purchases made or customers received. Utilizing this information, the advertiser may be able to determine the effectiveness of the advertisement.

While specific examples have been set forth regarding the use of additional characters to correspond with specific information, such examples should not be construed as limiting in any manner. In various embodiments, any number of characters may correspond to any type of information. For example, the advertiser may select any character or combination of characters to correspond to various types of information.

What is claimed is:

1. A method, comprising:
presenting to each of a first user, a second user, and a third user an advertisement including a plurality of alphanumeric codes in an offline media, each of the alphanumeric codes including a component representative of a good or service, and at least two of the alphanumeric codes including both the component representative of the good or service and a component representative of additional information, wherein the component representative of additional information is different for each of the at least two alphanumeric codes, such that each of the at least two alphanumeric codes including the different component representative of additional information are correlated with different additional information;
receiving by an advertiser a first one of the alphanumeric codes from a first device of the first user, a second one of the alphanumeric codes from a second device of the second user, and a third one of the alphanumeric codes from a third device of the third user, wherein:
the first one of the alphanumeric codes received from the first device of the first user includes the component representative of the good or service and a first component representative of first additional information including hours of operation for the good or service,
the second one of the alphanumeric codes received from the second device of the second user includes the component representative of the good or service and a second component representative of second additional information including driving directions for the good or service, and
the third one of the alphanumeric codes received from the third device of the third user includes only the component representative of the good or service;
identifying third user information in response to receiving the third one of the alphanumeric codes from the third device of the third user, the third user information including a payment method for purchasing the good or service associated with the advertisement, and further including a profile of the third user;
parsing, utilizing a processor, the first received one of the alphanumeric codes into the component representative of the good or service and the first component representative of the first additional information including the hours of operation for the good or service;
parsing the second received one of the alphanumeric codes into the component representative of the good or service and the second component representative of the second additional information including the driving directions for the good or service;
identifying that the third received one of the alphanumeric codes does not include a component representative of additional information, and bypassing parsing of the third received one of the alphanumeric codes;
for the first parsed one of the alphanumeric codes, first retrieving, utilizing the processor, a set of information associated with the component representative of the good or service, and subsequently retrieving the first additional information including the hours of operation for the good or service by querying a database utilizing the first component representative of the first additional information;
for the second parsed one of the alphanumeric codes, first retrieving the set of information associated with the component representative of the good or service, and subsequently retrieving the second additional information including the driving directions for the good or service by querying the database utilizing the second component representative of the second additional information;
for the third received one of the alphanumeric codes, querying the database utilizing the component representative of the good or service for retrieving all information on the good or service;
customizing the information on the good or service retrieved for the third received one of the alphanumeric codes based on the profile of the third user by selecting a customized portion of the information on the good or service retrieved for the third received one of the alphanumeric codes to send to the third device of the third user based on the profile of the third user;
sending the first additional information including the hours of operation for the good or service to the first device of the first user;
sending the second additional information including the driving directions for the good or service to the second device of the second user;
sending the customized portion of the information retrieved for the third received one of the alphanumeric codes to the third device of the third user; and
tracking a purchase of the good or service by at least one of the first user, the second user, and the third user, the tracking performed by using the received alphanumeric codes from the devices of the users to correlate the purchase of the good or service by the at least one of the first user, the second user, and the third user with at least one of the first user information, the second user information, and the third user information;
wherein the customized portion of the information retrieved for the third received one of the alphanumeric codes is formatted to match a format of the third one of the alphanumeric codes received from the third device of the third user.

2. The method of claim 1, wherein the additional information further includes at least one of available products or services, and coupons.

3. The method of claim 1, wherein the alphanumeric codes are capable of being manually keyed by the users utilizing keypads of the devices.

4. The method of claim 1, wherein at least one of the alphanumeric codes is received via a predetermined number.

5. The method of claim 1, wherein the devices include at least one mobile device.

6. The method of claim 1, wherein at least one of the alphanumeric codes is received utilizing a wireless protocol.

7. The method of claim 1, wherein at least one of the alphanumeric codes includes a serial number.

8. The method of claim 1, wherein at least one of the alphanumeric codes is received utilizing a short message service (SMS) protocol.

9. The method of claim 1, wherein the customized portion of the information retrieved for the third received one of the alphanumeric codes is sent by the advertiser.

10. The method of claim 1, wherein the purchase of the good or service by the at least one of the first user, the second user, and the third user is tracked utilizing a database.

11. The method of claim 1, wherein included is a database with the profile of the third user.

12. The method of claim 1, wherein formatting of the customized portion of the information retrieved for the third received one of the alphanumeric codes includes formatting the customized portion of the information retrieved for the third received one of the alphanumeric codes into an image capable of reception by the third device of the third user.

13. The method of claim 1, further including tracking a number of queries received for a particular one of the alphanumeric codes including the component representative of the good or service and a particular component representative of additional information.

14. The method of claim 1, wherein the component representative of additional information for each of the at least two alphanumeric codes is a single letter.

15. The method of claim 14, wherein the first component representative of the first additional information is a first single letter, and the second component representative of the second additional information is a second single letter, wherein the first single letter and the second single letter are different single letters.

16. The method of claim 15, wherein the hours of operation information for the good or service is retrieved in response to querying the database utilizing the first single letter, and the driving directions information for the good or service is retrieved in response to querying the database utilizing the second single letter.

17. The method of claim 1, wherein the information on the good or service retrieved for the third received one of the alphanumeric codes includes the hours of operation information for the good or service and a general location for the good or service.

18. The method of claim 15, wherein the plurality of alphanumeric codes presented in the offline media further include a fourth alphanumeric code, the fourth alphanumeric code including the component representative of the good or service and a third component representative of third additional information including available products for the good or service.

19. The method of claim 18, wherein, in response to receiving the fourth alphanumeric code including the component representative of the good or service and the third component representative of the third additional information including the available products for the good or service, the available products information corresponding to the third component representative of the third additional information is sent.

20. The method of claim 19, wherein the sent third additional information including the available products for the good or service includes a menu for a restaurant.

21. The method of claim 19, wherein the sent third additional information including the available products for the good or service includes seating availability.

22. The method of claim 19, wherein the sent third additional information including the available products for the good or service includes rental availability for a movie.

23. A computer program product embodied on a non-transitory computer readable medium, comprising:
  computer code for presenting to each of a first user, second user, and a third user an advertisement including a plurality of alphanumeric codes in an offline media, each of the alphanumeric codes including a component representative of a good or service, and at least two of the alphanumeric codes including both the component representative of the good or service and a component representative of additional information, wherein the component representative of additional information is different for each of the at least two alphanumeric codes, such that each of the at least two alphanumeric codes including the different component representative of additional information are correlated with different additional information;
  computer code for receiving by an advertiser a first one of the alphanumeric codes from a first device of the first user, a second one of the alphanumeric codes from a second device of the second user, and a third one of the alphanumeric codes from a third device of the third user, wherein:
    the first one of the alphanumeric codes received from the first device of the first user includes the component representative of the good or service and a first component representative of first additional information including hours of operation for the good or service,
    the second one of the alphanumeric codes received from the second device of the second user includes the component representative of the good or service and a second component representative of second additional information including driving directions for the good or service, and
  the third one of the alphanumeric codes received from the third device of the third user includes only the component representative of the good or service;
  computer code for identifying third user information in response to receiving the third one of the alphanumeric codes from the third device of the third user, the third user information including a payment method for purchasing the good or service associated with the advertisement, and further including a profile of the third user;
  computer code for parsing the first received one of the alphanumeric codes into the component representative of the good or service and the first component representative of the first additional information including the hours of operation for the good or service;
  computer code for parsing the second received one of the alphanumeric codes into the component representative of the good or service and the second component representative of the second additional information including the driving directions for the good or service;
  computer code for identifying that the third received one of the alphanumeric codes does not include a component representative of additional information, and bypassing parsing of the third received one of the alphanumeric codes;
  computer code for, for the first parsed one of the alphanumeric codes, first retrieving a set of information associated with the component representative of the good or service, and subsequently retrieving the first additional information including the hours of operation for the good or service by querying a database utilizing the first component representative of the first additional information;
  computer code for, for the second parsed one of the alphanumeric codes, first retrieving the set of information associated with the component representative of the good or service, and subsequently retrieving the second additional information including the driving directions for the good or service by querying the database utilizing the second component representative of the second additional information;
  computer code for, for the third received one of the alphanumeric codes, querying the database utilizing the component representative of the good or service for retrieving all information on the good or service;
  computer code for customizing the information on the good or service retrieved for the third received one of the alphanumeric codes based on the profile of the third user by selecting a customized portion of the information on the good or service retrieved for the third received one of the alphanumeric codes to send to the third device of the third user based on the profile of the third user;

computer code for sending the first additional information including the hours of operation for the good or service to the first device of the first user;

computer code for sending the second additional information including the driving directions for the good or service to the second device of the second user;

computer code for sending the customized portion of the information retrieved for the third received one of the alphanumeric codes to the third device of the third user; and computer code for tracking a purchase of the good or service by at least one of the first user, the second user, and the third user, the tracking performed by using the received alphanumeric codes from the devices of the users to correlate the purchase of the good or service by the at least one of the first user, the second user, and the third user with at least one of the first user information, the second user information, and the third user information;

wherein the computer program product is operable such that the customized portion of the information retrieved for the third received one of the alphanumeric codes is formatted to match a format of the third one of the alphanumeric codes received from the third device of the third user.

24. A system, comprising:

an advertisement server including a processor for:

presenting to each of a first user, second user, and a third user an advertisement including a plurality of alphanumeric codes in an offline media, each of the alphanumeric codes including a component representative of a good or service, and at least two of the alphanumeric codes including both the component representative of the good or service and a component representative of additional information, wherein the component representative of additional information is different for each of the at least two alphanumeric codes, such that each of the at least two alphanumeric codes including the different component representative of additional information are correlated with different additional information;

receiving by an advertiser a first one of the alphanumeric codes from a first device of the first user, a second one of the alphanumeric codes from a second device of the second user, and a third one of the alphanumeric codes from a third device of the third user, wherein:

the first one of the alphanumeric codes received from the first device of the first user includes the component representative of the good or service and a first component representative of first additional information including hours of operation for the good or service, the second one of the alphanumeric codes received from the second device of the second user includes the component representative of the good or service and a second component representative of second additional information including driving directions for the good or service, and the third one of the alphanumeric codes received from the third device of the third user includes only the component representative of the good or service;

identifying third user information in response to receiving the third one of the alphanumeric codes from the third device of the third user, the third user information including a payment method for purchasing the good or service associated with the advertisement, and further including a profile of the third user;

parsing the first received one of the alphanumeric codes into the component representative of the good or service and the first component representative of the first additional information including the hours of operation for the good or service;

parsing the second received one of the alphanumeric codes into the component representative of the good or service and the second component representative of the second additional information including the driving directions for the good or service;

identifying that the third received one of the alphanumeric codes does not include a component representative of additional information, and bypassing parsing of the third received one of the alphanumeric codes;

for the first parsed one of the alphanumeric codes, first retrieving a set of information associated with the component representative of the good or service, and subsequently retrieving the first additional information including the hours of operation for the good or service by querying a database utilizing the first component representative of the first additional information;

for the second parsed one of the alphanumeric codes, first retrieving the set of information associated with the component representative of the good or service, and subsequently retrieving the second additional information including the driving directions for the good or service by querying the database utilizing the second component representative of the second additional information;

for the third received one of the alphanumeric codes, querying the database utilizing the component representative of the good or service for retrieving all information on the good or service;

customizing the information on the good or service retrieved for the third received one of the alphanumeric codes based on the profile of the third user by selecting a customized portion of the information on the good or service retrieved for the third received one of the alphanumeric codes to send to the third device of the third user based on the profile of the third user;

sending the first additional information including the hours of operation for the good or service to the first device of the first user;

sending the second additional information including the driving directions for the good or service to the second device of the second user;

sending the customized portion of the information retrieved for the third received one of the alphanumeric codes to the third device of the third user; and tracking a purchase of the good or service by at least one of the first user, the second user, and the third user, the tracking performed by using the received alphanumeric codes from the devices of the users to correlate the purchase of the good or service by the at least one of the first user, the second user, and the third user with at least one of the first user information, the second user information, and the third user information;

wherein the customized portion of the information retrieved for the third received one of the alphanumeric codes is formatted to match a format of the third one of the alphanumeric codes received from the third device of the third user.

* * * * *